United States Patent [19]
Knighton et al.

[11] Patent Number: 6,032,866
[45] Date of Patent: Mar. 7, 2000

[54] FOLDABLE APPARATUS HAVING AN INTERFACE

[75] Inventors: Mark S. Knighton, Santa Monica; David S. Agabra, Redondo Beach; David D. Drobnis, Venice; John M. Vernon, Malibu, all of Calif.

[73] Assignee: Motorola, Inc., Schaumburg, Ill.

[21] Appl. No.: 08/926,792

[22] Filed: Sep. 10, 1997

[51] Int. Cl.[7] .................................................. G06K 19/06
[52] U.S. Cl. ...................................... 235/492; 235/472.01
[58] Field of Search ............................... 235/462.36, 492, 235/472.01

[56] References Cited

U.S. PATENT DOCUMENTS

| | | |
|---|---|---|
| 4,721,849 | 1/1988 | Davis et al. . |
| 4,801,789 | 1/1989 | Davis . |
| 4,803,474 | 2/1989 | Kulp . |
| 4,916,441 | 4/1990 | Gombrich . |
| 5,153,590 | 10/1992 | Charlier . |
| 5,175,759 | 12/1992 | Metroka et al. . |
| 5,331,136 | 7/1994 | Koench et al. . |
| 5,373,149 | 12/1994 | Rasmussen ............................ 235/492 |
| 5,384,910 | 1/1995 | Torres . |
| 5,386,568 | 1/1995 | Wold et al. . |
| 5,410,141 | 4/1995 | Koench et al. . |
| 5,416,310 | 5/1995 | Little . |
| 5,468,952 | 11/1995 | Alexander et al. ................. 235/462.36 |
| 5,539,807 | 7/1996 | Ghisler et al. . |
| 5,552,806 | 9/1996 | Lenchik . |
| 5,656,804 | 8/1997 | Barkan et al. . |
| 5,734,371 | 3/1998 | Kaplan . |
| 5,834,749 | 11/1998 | Durbin . |

OTHER PUBLICATIONS

DatO™ Patented Pointing Gesture System by Evan Graham Ph.D., White Paper, 20 pp., Mar. 3, 1997.

*Primary Examiner*—Harold I. Pitts
*Attorney, Agent, or Firm*—James E. Gauger; Jeffrey G. Toler

[57] ABSTRACT

A foldable apparatus includes a first housing (20), a second housing (22), and an interface (24). The second housing (22) is pivotally connected to the first housing (20). The interface (24) has a first portion (26) associated with the first housing (20) and a second portion (28) associated with the second housing (22).

19 Claims, 5 Drawing Sheets

FOLDABLE APPARATUS HAVING AN INTERFACE

TECHNICAL FIELD

The present invention relates to optical readers including bar code readers.

BACKGROUND OF THE INVENTION

Many forms of handheld devices having an integrated optical data reader are presently available. These forms include a wand form, a gun form, a card form, and a handheld computer form.

Wand-shaped devices are typically sized and shaped like a cigar. An optical data reader such as a bar code reader is accessible at an end of the device. The wand-shaped device is held like a pencil for swiping the optical data reader across a printed code such as a bar code. Data read by the optical data reader are communicated from the wand-shaped device to a computer via either a wireline connection or a radio frequency interface.

Gun-type devices have a handle for holding like a gun. The device includes an optical data reader such as a scanning bar code reader. An end user aims the optical data reader toward a printed code. The optical data reader is activated and deactivated by a trigger promimate to the handle. Data read by a gun-type device are typically communicated to a computer via a wireline connection.

Examples of a card-shaped optical code readers are described in U.S. Pat. No. 4,721,849 to Davis et al. and U.S. Pat. No. 4,801,789 to Davis. U.S. Pat. No. 4,721,849 discloses a card-shaped reader having an input/output connector for interfacing with a host computer.

The handheld computer form has a bar code reader accessible at an end of a single housing. The single housing supports a keypad and a display in a manner similar to a handheld calculator.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

Embodiments of the present invention provide an apparatus having an optical reader integrated with a foldable housing. In a folded state, the apparatus can be comfortably grasped and manipulated for reading optical data such as bar codes, printed text, and/or human-viewable images. In an unfolded state, the apparatus has a card-shaped form amenable for carrying by an end user in a pocket, a wallet, a purse, a portfolio, or other articles having a card holder. As a result, the end user is afforded the capability of reading optical data for subsequent downloading to an external device such as a like apparatus, a computer, or a personal digital assistant, using an apparatus having a commonly-carried form factor.

Figure 1:
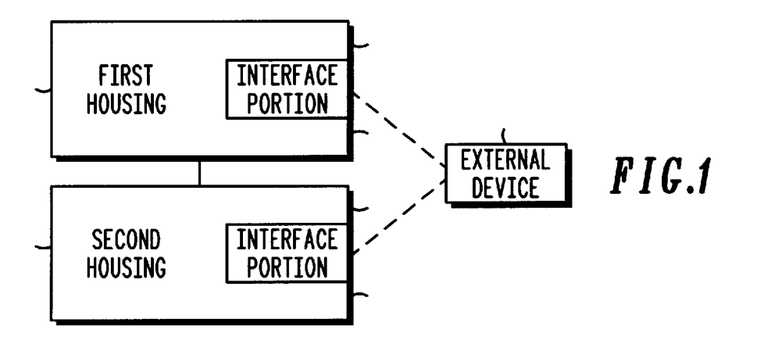
FIG. 1 is a block diagram of an apparatus in accordance with the present invention.

FIG. 1 is a block diagram of an apparatus in accordance with the present invention. The apparatus comprises a housing including a first housing 20 and a second housing 22. The second housing 22 is pivotally connected to the first housing 20. When pivoted to a folded position, the housing preferably has an elongate form amenable for grasping in a manner similar to grasping a writing implement such as a pen, a pencil, or a stylus.

When pivoted to an unfolded position, the housing preferably has a card-shaped periphery for carrying within a wallet, a purse, a daily planner, a portfolio, or other article having a card holder. In this case, for example, the periphery of the housing can have the shape and size of a credit card, a PCMCIA card, a business card, a smart card, an index card, a trading card, or a playing card when unfolded.

The apparatus further comprises an interface 24 supported by the housing. The interface 24 includes a first portion 26 associated with the first housing 20 and a second portion 28 associated with the second housing 22. The interface 24 is used to communicate signals with an external device 30.

In a preferred embodiment, the interface 24 includes an optical reader having an emitter associated with the first housing 20 and a detector associated with the second housing 22. In this case, the optical reader reads optical data from the external device 30.

Preferably, the optical reader includes a printed code reader such as a bar code reader to read a bar code from the external device 30. Alternatively, the optical reader can include an optical text reader to read text from the external device 30. As another alternative, the optical reader can include an optical imaging scanner to read and digitize text and graphics from the external device 30.

Dependent upon which types of optical data are to be read, the optical reader can include a single optical detector or a plurality of optical detectors. The plurality of optical detectors can be arranged in a one-dimensional linear array, a two-dimensional array, or a nonlinear array, for example. Further, the optical reader can include a single optical emitter or a plurality of optical emitters to illuminate the optical data. Alternatively, the optical reader can be absent of an optical emitter in cases where additional illumination of the optical data is not required.

The external device 30 can be either passive or active. An example of a passive external device includes a substrate such as paper or plastic having optical data in the form of printed data. The printed data can include a bar code, textual data, or graphical data, for example. Active external devices can include electrically-controllable light-emitting elements, light-absorbing elements, and/or light-reflecting elements to generate the optical data. Examples of active external devices include, but are not limited to, cathode ray tubes, light-emitting displays, liquid crystal displays, and other electrically-activated display devices.

In another embodiment, the interface 24 includes one or more connectors associated with the first housing 20 and one or more connectors associated with the second housing 22. Here, the interface 24 preferably comprises a PCMCIA interface having a first plurality of PCMCIA connectors associated with the first housing 20 and a second plurality of PCMCIA connectors associated with the second housing 22.

In this embodiment, the external device 30 typically includes a socket into which the apparatus is inserted. Examples of the external device 30 include, but are not limited to, a personal computer, a notebook computer, a handheld computer, and a personal digital assistant each having a PCMCIA slot. Regardless of its form, the external device 30 includes a PCMCIA interface which mates with the interface 24. Signals are communicated between the apparatus and the external device 30 in accordance with PCMCIA signal standards.

Optionally, the apparatus can include two or more interfaces. For example, the apparatus can include both an optical reader and a PCMCIA interface.

Figure 2:
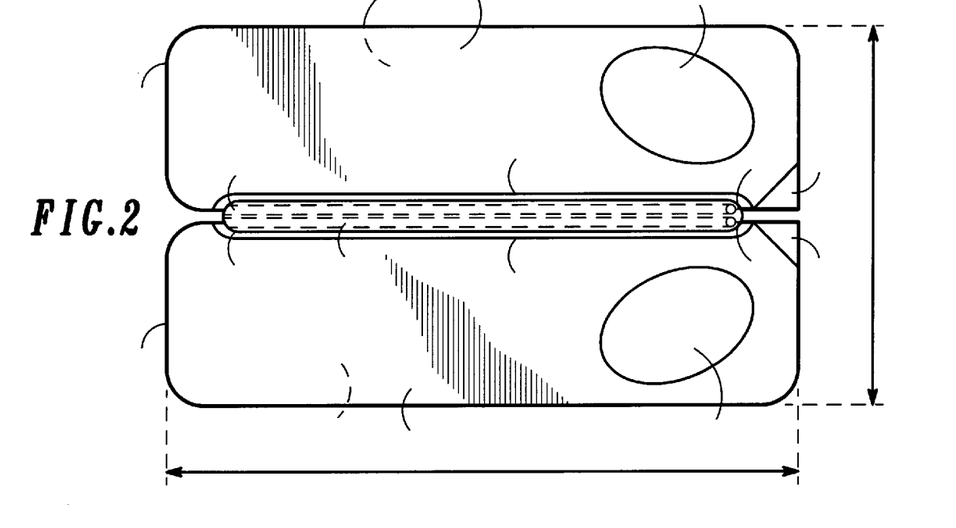
FIG. 2 is a side view of a preferred embodiment of the apparatus of FIG. 1 in an unfolded state.

FIG. 2 is a side view of a preferred embodiment of the apparatus of FIG. 1 in an unfolded state. In this embodiment, the first housing 20 and the second housing 22 are generally planar. In particular, the first housing 20 has two major surfaces 34 and 36 that are generally planar. Similarly, the second housing 22 has two major surfaces 40 and 42 that are generally planar.

In the unfolded state, the first housing 20 and the second housing 22 are generally coplanar. In particular, the major surface 34 is generally flush with the major surface 40, and the major surface 36 is generally flush with the major surface 42 in the unfolded state.

A hinge 44 pivotally connects the first housing 20 to the second housing 22. The hinge 44 includes a bearing 46 and a bearing 48. The bearing 46 is parallel to the bearing 48. The bearing 46 receives and retains a journal such as a pin 50 proximate to an edge 52 of the first housing 20. The bearing 48 receives and retains a journal such as a pin 54 proximate to an edge 56 of the second housing 22.

The first housing 20 is pivotable about an axis through the bearing 46. The second housing 22 is pivotable about an axis through the bearing 48. In this way, the first housing 20 and the second housing 22 are pivotally connected at the edges 52 and 56, respectively. It is noted that alternative hinges can be employed to pivotally connect the first housing 20 to the second housing 22.

In the unfolded state, the apparatus has a footprint (i.e. a periphery) similar to a card such as a credit card. To fit within a card-receiving slot in a typical wallet, the apparatus has a first dimension 60 of about 3.75 inches or less, and a second dimension 62 of about 2.75 inches or less. In an exemplary embodiment, the first dimension 60 is about 3.375 inches and the second dimension 62 is about 2.125 inches.

Preferably, the first housing 20, the second housing 22, and the hinge 44 are formed of a fine-finished alloy. Alternatively, the first housing 20, the second housing 22, and the hinge 44 can be formed of plastic such as injection molded ABS/PC. It is noted that the first housing 20, the second housing 22, and the hinge 44 can be formed of alternative materials using alternative processes.

The apparatus includes an optical reader having an emitter and a detector housed or otherwise supported by the housing. The emitter emits light near a corner portion 64 adjacent the edge 52. The detector detects light near a corner portion 66 adjacent the edge 56. The corner portions 64 and 66 are formed of a transparent acrylic material to allow optical signals to communicate therethrough.

A button pad 68 is supported at a face of the first housing 20 defined by the major surface 34. A button pad 70 is supported at a face of the second housing 22 defined by the major surface 40. The button pads 68 and 70 are depressed by the end user to control the activation and the deactivation of the optical reader.

Figure 3:
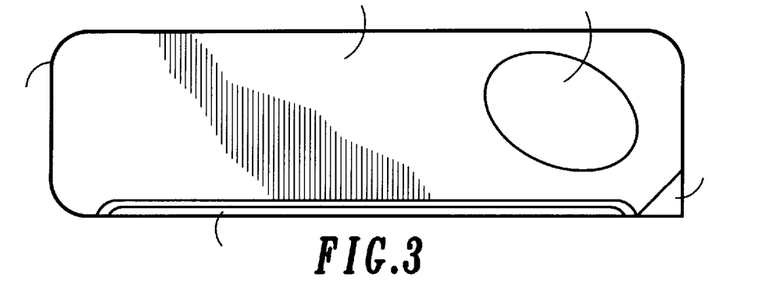
FIG. 3 is a side view of the apparatus of FIG. 2 in a folded state.

FIG. 3 is a side view of the apparatus of FIG. 2 in a folded state. In the folded state, the first housing 20 and the second housing 22 are no longer coplanar. In the view of FIG. 3, the second housing 22 is located behind the first housing 20.

In the folded state, the apparatus assumes a form amenable for reading optical data from the external device 30. In particular, an end user grasps the apparatus in a manner similar to grasping a writing implement such as a pen, a pencil, or a stylus. While grasping the apparatus, the user depresses one or both of the button pads 68 and 70 to activate the optical reader. Thereafter, the user swipes the corner portions 64 and 66 across printed data, such as a bar code, from a substrate such as paper. After reading the printed data, the user releases one or both of the button pads 68 and 70 to deactivate the optical reader. In this way, the printed data is optically read by the apparatus.

Figure 4:
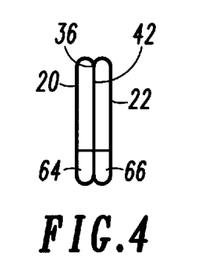
FIG. 4 is an end view of the apparatus of FIG. 2 in a first folded state.

FIG. 4 is an end view of the apparatus of FIG. 2 in a first folded state. In the first folded state, the major surface 36 of the first housing 20 contacts the major surface 42 of the second housing 22. Although not coplanar, the first housing 20 and the second housing 22 are generally parallel in the first folded state.

Figure 5:
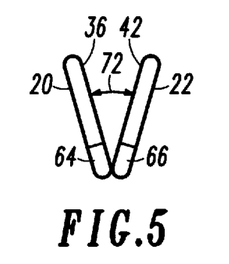
FIG. 5 is an end view of the apparatus of FIG. 2 in a second folded state.

FIG. 5 is an end view of the apparatus of FIG. 2 in a second folded state. In the second folded state, the major surface 36 of the first housing 20 is separated from the major surface 42 of the second housing 22. Consequently, the apparatus assumes a non-planar, V-shaped form wherein the first housing 20 is transverse to the second housing 22. The non-planar, V-shaped form may be easier to grasp and manipulate for some users in comparison to the first folded state described with reference to FIG. 4.

Preferably, an angle 72 between the first housing 20 and the second housing 22 is greater than or equal to 15°. The angle 72 can be constrained by the hinge 74 and/or by portions of the first housing 20 and the second housing 22.

Figure 6:
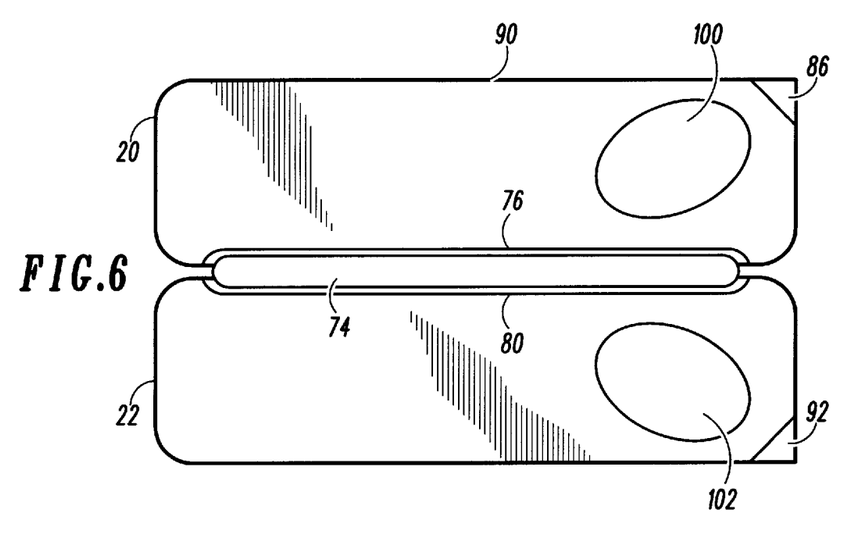
FIG. 6 is a side view of an alternative embodiment of the apparatus of FIG. 1 in an unfolded state.

FIG. 6 is a side view of an alternative embodiment of the apparatus of FIG. 1 in an unfolded state. As with the embodiment of FIG. 2, the first housing 20 and the second housing 22 are generally planar, and are generally coplanar in the unfolded state. In the unfolded state, the apparatus has a card-shaped periphery such as those described with reference to FIGS. 1 and 2.

A hinge 74 pivotally connects the first housing 20 to the second housing 22. Preferably, the hinge 74 is equivalent to the hinge 44 described with reference to FIG. 2. The first housing 20 and the second housing 22 are pivotally connected at edges 76 and 80, respectively.

The apparatus include an optical reader having an emitter and a detector housed or otherwise supported by the housing. The emitter emits light near a corner portion 86 adjacent an edge 90 opposite the edge 76. The detector detects light near a corner portion 92 adjacent an edge 94 opposite the edge 80. The corner portions 86 and 92 are formed of a transparent acrylic material to allow optical signals to communicate therethrough.

Figure 7:
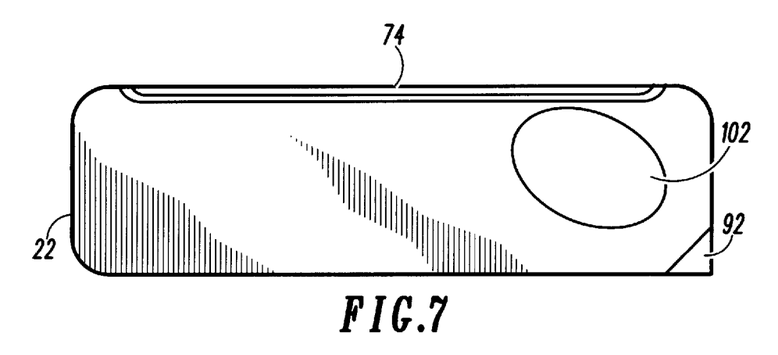
FIG. 7 is a side view of the apparatus of FIG. 6 in a folded state.

FIG. 7 is a side view of the apparatus of FIG. 6 in a folded state. In the view of FIG. 7, the second housing 22 is located behind the first housing 20. Preferably, an end view of the apparatus in the folded state is similar to one illustrated in FIG. 4. Here, the first housing 20 and the second housing 22 are no longer coplanar, but are generally parallel. A major surface 94 of the first housing 20 contacts a major surface 96 of the second housing 22 in the folded state.

In the folded state, the apparatus assumes a form amenable for reading optical data from the external device 30. In particular, an end user grasps the apparatus in a manner similar to grasping a writing implement such as a pen, a pencil, or a stylus. While grasping the apparatus, the user depresses one or both of button pads 100 and 102 to activate the optical reader. Thereafter, the user swipes the corner portions 86 and 92 across printed data, such as a bar code, from a substrate such as paper. After reading the printed data, the user releases one or both of the button pads 100 and 102 to deactivate the optical reader. In this way, printed data is optically read using the apparatus.

Figure 8:
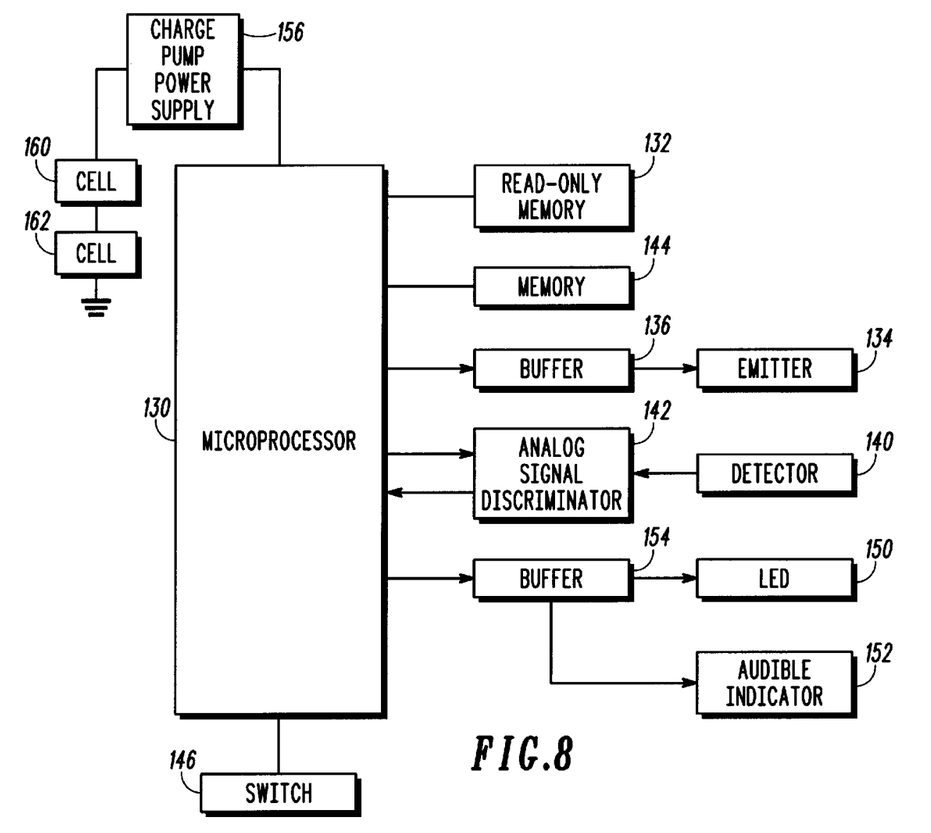
FIG. 8 is a block diagram of an embodiment of an optical reader circuit.

FIG. 8 is a block diagram of an embodiment of an optical reader circuit. The optical reader circuit is housed or otherwise supported by the first housing 20 and/or the second housing 22 of the apparatus.

A microprocessor 130 directs the operation of the circuit in accordance with routines stored in a read-only memory 132. The read-only memory 132 includes a bar code driver routine and a data communication routine.

An emitter 134, which preferably includes an infrared light-emitting diode, is responsive to the microprocessor 130 via a buffer 136. A detector 140, which preferably includes an infrared photodiode, is coupled to the microprocessor 130 by an analog signal discriminator 142. Preferably, the emitter 134, the detector 140, the buffer 136, and the analog signal discriminator 142 are included in an IrDA (Infrared Data Association)-compliant transceiver. A preferred IrDA-compliant transceiver is available from Hewlett-Packard Corporation.

In accordance with the bar code driver routine, the microprocessor 130 drives the emitter 134 to illuminate a portion of a bar code. The microprocessor 130 reads data associated with a portion of the bar code from the detector 140. After reading the bar code, the microprocessor 130 decodes data encoded by the bar code. The microprocessor 130 stores either the encoded data or the decoded data in a memory 144. Preferably, the memory 144 includes a nonvolatile memory device such as an EEPROM to maintain the data in the absence of a powering signal.

In accordance with the data communication routine, the microprocessor 130 drives the emitter 134 to communicate data stored in the memory 144. Preferably, the data communication routine is compliant with an IrDA data communication protocol such as the 9600 baud IrDA protocol. As a result, data can be communicated with another like optical reading apparatus, or with other devices having an IrDA interface such as notebook computers, palmtop computers, and personal digital assistants.

Additionally in accordance with the data communication routine, the microprocessor 130 decodes data received by the detector 140. Preferably, the data is decoded in accordance with an IrDA protocol. The microprocessor 130 can store the data in the memory 144. The data can include data read from a like optical reading apparatus, or a routine executable by the microprocessor 130 to provide additional functionality.

The microprocessor 130 is responsive to a sensor such as a switch 146 to activate and deactivate the optical code reading and data communication features of the circuit. The switch 146 senses a user-initiated depression and release of the button pads described herein.

One or more indicators, such as a light-emitting diode 150 and/or an optional audible indicator 152, are responsive to the microprocessor 130 via a buffer 154. The one or more indicators indicate the status of the circuit.

A charge pump power supply 156 regulates a series combination of cells 160 and 162 to power the various components of the circuit. The charge pump power supply 156 includes a voltage regulator and other associated components. Preferably, the cells 160 and 162 include coin cells such as CR2016 lithium coin cells.

Figure 9:
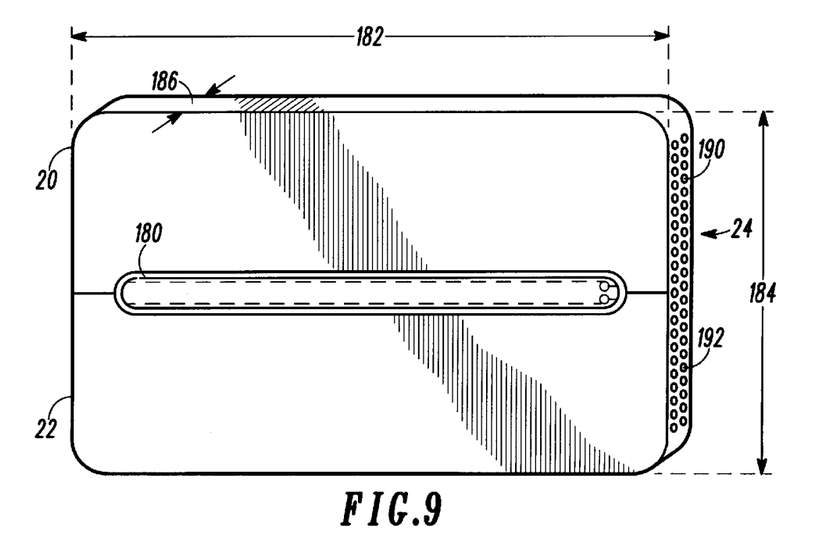
FIG. 9 is a view of an alternative embodiment of the apparatus of FIG. 1 in an unfolded state.

FIG. 9 is a view of an alternative embodiment of the apparatus of FIG. 1 in an unfolded state. The first housing 20 and the second housing 22 are pivotally connected by a hinge 180. In the unfolded state, the housing has a periphery which is shaped and sized in accordance with a PCMCIA (Personal Computer Memory Card International Association) form standard. Preferably, the housing has a length 182 of about 85.6 mm, a width 184 of about 54.0 mm, and a thickness 186 dependent upon the PCMCIA type. For example, the thickness 186 is about 3.3 mm for Type I, 5.0 mm for Type II, and 10.5 mm for Type III.

The interface 24 comprises a PCMCIA bus connector. In accordance with PCMCIA standards, the interface 24 includes sixty-eight connectors which mate with sixty-eight pins in a mating connector associated with the external device 30. Preferably, thirty-four connectors 190 are supported by the first housing 20 and thirty-four connectors 192 are supported by the second housing 22.

This configuration provides a foldable PCMCIA card. In general, the foldable PCMCIA card can include a circuit such as a modem, a memory, or another peripheral associated with PCMCIA cards. Preferably, the foldable PCMCIA card includes an optical reader such as those described herein. In this case, the PCMCIA interface is in communication with the microprocessor 130 described with reference to FIG. 8. The microprocessor 130 is operative to direct data read by the optical reader (and optionally, stored in the memory 144) to be communicated via the PCMCIA interface, and to direct data received via the PCMCIA interface (and optionally, stored in the memory 144) to be communicated via the emitter 134. A preferred form of an optical reading apparatus having a PCMCIA interface is described with reference to FIGS. 10 to 13.

Figure 10:
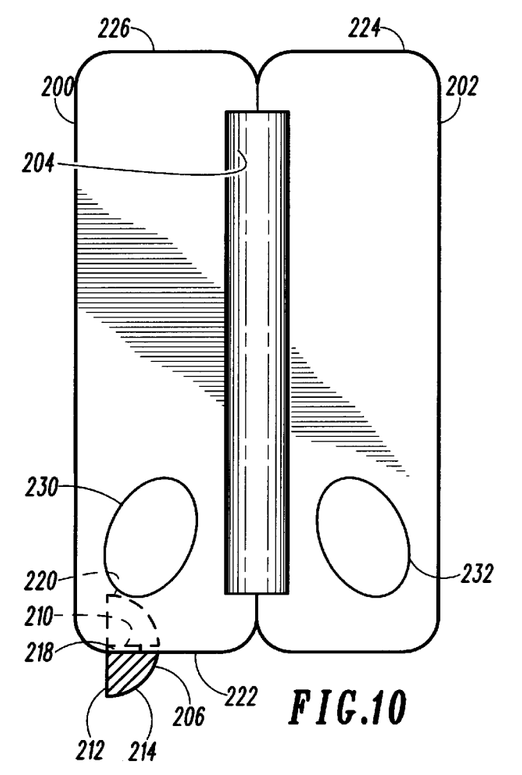
FIG. 10 is an top view of an alternative embodiment of a housing for an optical reading apparatus.

FIG. 10 is an top view of an alternative embodiment of a housing for an optical reading apparatus. As with the embodiment of FIG. 2, the housing includes a first housing 200 and the second housing 202 which are pivotally connected by a hinge 204. In an unfolded state, the apparatus has a generally planar, card-shaped form such as those described with reference to FIGS. 1 and 2.

A light-communicating member 206 communicates light between the external device 30 and the optical reader housed by the housing. In particular, the light-communicating member 206 receives a first optical signal associated with the optical data from the external device 30. The light-communicating member 206 communicates the first optical signal to a detector of the optical reader. Preferably, the light-communicating member 206 further communicates a second optical signal from a detector of the optical reader to the external device 30. The second optical signal can illuminate the optical data to assist in forming the first optical signal. Alternatively, the second optical signal can be used to communicate data to the external device 30.

The light-communicating member 206 has a form of a portion of a disk bounded by a first radial end 210, a second radial end 212, and an arcuate end 214. Preferably, the length of the radial ends 210 and 212 is about 0.25 inches. It is also preferred that the arcuate end 214 sweeps an angle of approximately 90°. It is further preferred that the light-communicating member 206 be formed of a transparent acrylic material.

The light-communicating member 206 articulates about an axis 216 transverse to (and preferably normal to) the first housing 200 at a pivot point 218. When pivoted to a first position, the light-communicating member 206 is housed by a void 220 defined by the first housing 200. In the first position, the second radial end 212 is generally flush with an edge 222 of the first housing 200.

When pivoted to a second position as illustrated in FIG. 10, the light-communicating member 206 projects beyond the first housing 200. In this position, the second radial end 212 is transverse to the edge 222. Preferably, the first radial end 210 is generally parallel to the edge 222, and the second radial end 212 is generally perpendicular to the edge 222 in the second position.

Optionally, the apparatus includes a PCMCIA interface at an edge 224 and an edge 226 opposite to the edge 222. The PCMCIA interface is integrated with the apparatus in accordance with the teachings of FIG. 9.

Figure 11:
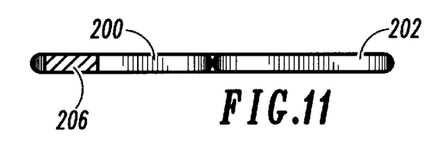
FIG. 11 is an end view of the housing of FIG. 10 in an unfolded state.

FIG. 11 is an end view of the housing of FIG. 10 in an unfolded state. The first housing 200 and the second housing 202 are generally planar, and are generally coplanar with each other.

Figure 12:
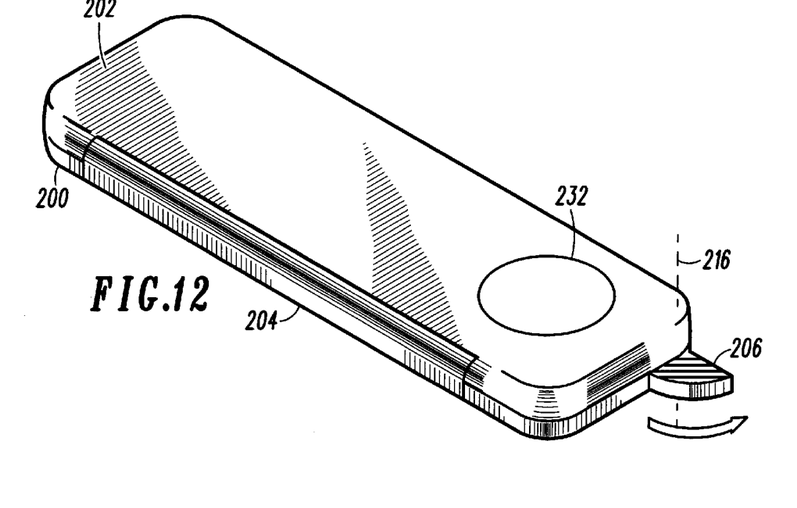
FIG. 12 is an isometric view of the housing of FIG. 10 in a folded state.

FIG. 12 is an isometric view of the housing of FIG. 10 in a folded state. In the folded state, the apparatus assumes a form amenable for reading optical data from the external device 30. In particular, an end user grasps the apparatus in a manner similar to grasping a writing implement such as a pen, a pencil, or a stylus. While grasping the apparatus, the user depresses one or both of button pads 230 and 232 to activate the optical reader. Thereafter, the user swipes the light-communicating member 206 across printed data, such as a bar code, from a substrate such as paper. After reading the printed data, the user releases one or both of the button pads 230 and 232 to deactivate the optical reader.

Figure 13:
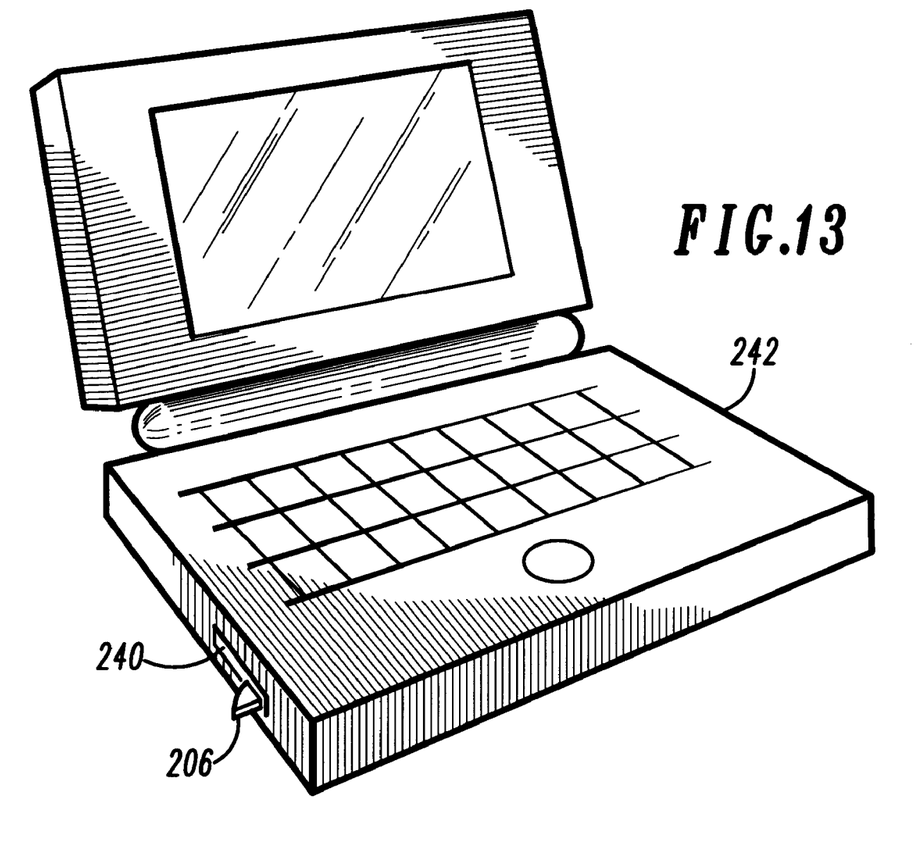
FIG. 13 is a view of the housing of FIG. 10 inserted into a PCMCIA socket of a computer.

FIG. 13 is a view of the housing of FIG. 10 inserted into a PCMCIA socket 240 of a computer 242. Here, the PCMCIA interface of the apparatus mates with a PCMCIA interface in the PCMCIA socket 240. The light-communicating member 206 is pivoted to project from the PCMCIA socket 240. Using the apparatus, optical signals can be communicated between the computer 242 and a peripheral. Examples of peripherals include printers, remote controllers, handheld computers, personal digital assistants, and other devices having an infrared interface such as an IrDA interface.

The herein-described embodiments of the present invention can be used in a variety of optical reading applications. Of particular interest are electronic network navigation applications such as those described in the copending application entitled "Electronic Network Navigation Device and Method for Linking to an Electronic Address Therewith", having Ser. No. 08/710,820 which is hereby incorporated by reference into this disclosure.

Thus, there has been described herein several embodiments including preferred embodiments of a foldable apparatus having an interface.

Because the various embodiments of the present invention incorporate an optical reader with a foldable card-shaped housing, they provide a significant improvement in that the apparatus can be stored in a card holder (such as in a wallet, a purse, a daily planner, or a portfolio) when in an unfolded state, and can be grasped like a writing implement to optically read data when in a folded state. Constraining the housing to be V-shaped in the folded state may facilitate ease in grasping and manipulating the apparatus when optically reading data.

Additionally, various embodiments of the present invention as herein-described provide a foldable PCMCIA card. The foldable PCMCIA card can include an optical reader to provide an optical-to-PCMCIA interface. In this case, data can be communicated with external devices using optoelectronic devices of the optical reader or with the PCMCIA interface. By sharing the optoelectronic devices for both data communication and optical reading functions, the weight and price to provide both functions are reduced.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. An apparatus comprising:
    a first housing having a first major dimension;
    a second housing having a second major dimension, the second housing pivotably connected to the first housing, the second housing pivotable about an axis substantially parallel to the first major dimension and the second major dimension; and
    an optical reader having an optical emitter associated with the first housing and an optical detector associated with the second housing.

2. The apparatus of claim 1 wherein the optical reader includes a printed code reader.

3. The apparatus of claim 2 wherein the printed code reader includes a bar code reader.

4. The apparatus of claim 1 wherein the optical emitter emits light near a first corner portion of the first housing, and wherein the optical detector detects light near a second corner portion of the second housing.

5. The apparatus of claim 4 wherein the first housing includes a first edge to which the second housing is pivotally connected at a second edge, wherein the first corner portion is adjacent the first edge, and wherein the second corner portion is adjacent the second edge.

6. The apparatus of claim 4 wherein the first housing includes a first edge to which the second housing is pivotally connected at a second edge, wherein the first corner portion is adjacent an edge opposite the first edge, and wherein the second corner portion is adjacent an edge opposite the second edge.

7. The apparatus of claim 1 wherein the interface includes a first at least one connector associated with the first housing, and a second at least one connector associated with the second housing.

8. The apparatus of claim 7 wherein the interface includes a PCMCIA interface.

9. The apparatus of claim 8 wherein the PCMCIA interface includes a first thirty-four connectors associated with the first housing and a second thirty-four connectors associated with the second housing.

10. The apparatus of claim 1 wherein when pivoted to a first position, the first housing and the second housing are generally coplanar.

11. The apparatus of claim 10 wherein when pivoted to a second position, the first housing and the second housing are generally parallel.

12. The apparatus of claim 1 wherein at least one of the first housing and the second housing is generally planar.

13. The apparatus of claim 1 wherein the first housing and the second housing have a combined periphery which is PCMCIA card-shaped when pivoted to an unfolded position.

14. An optical reading apparatus comprising:

a first housing having a first corner portion;

a second housing having a second corner portion, the second housing pivotally connected to the first housing; and an optical reader having an emitter to emit light from the first corner portion and a detector to detect light from the second corner portion;

wherein the first housing and the second housing have a combined periphery which is PCMCIA card-shaped when pivoted to an unfolded position.

15. An optical reading apparatus comprising:

a housing;

a light-communicating member having a first radial end, a second radial end, and an arcuate end, the light-communicating member pivotable with respect to the housing; and an optical reader in optical communication with the light-communicating member.

16. The optical reading apparatus of claim 15 wherein the housing defines a void to house the light-communicating member when pivoted to a predetermined position.

17. The optical reading apparatus of claim 15 wherein the second radial end is generally flush with an edge of the housing when pivoted to a predetermined position.

18. The optical reading apparatus of claim 15 wherein the light-communicating member projects from a periphery of the housing when pivoted to a predetermined position.

19. The optical reading apparatus of claim 15 wherein the second radial end is transverse to an edge of the housing when pivoted to a predetermined position.

* * * * *